Nov. 8, 1966 Q. A. KERNS ETAL 3,284,642

PULSE TIME DELAY CIRCUIT EMPLOYING TUNNEL DIODE AND SWITCH COMBINATION GATED IN RESPONSE TO RAMP INPUT

Filed Jan. 10, 1964

INVENTORS
QUENTIN A. KERNS
MEIR BIRK
THOMAS A. NUNAMAKER
BY Richard A. Anderson
ATTORNEY

United States Patent Office 3,284,642

Patented Nov. 8, 1966

3,284,642

PULSE TIME DELAY CIRCUIT EMPLOYING TUNNEL DIODE AND SWITCH COMBINATION GATED IN RESPONSE TO RAMP INPUT

Quentin A. Kerns, Orinda, Calif., Mier Birk, Rehovoth, Israel, and Thomas A. Nunamaker, San Pablo, Calif., assignors to the United States of America as represented by the United States Atomic Energy Commission Filed Jan. 10, 1964, Ser. No. 337,114
8 Claims. (Cl. 307—88.5)

The present invention relates generally to electronic pulse circuitry and more particularly to a circuit component which, in accordance with the magnitude of a control signal, accurately varies the time delay of pulses in a train of pulses. The invention described herein was made in the course of, or under, contract W–7405–eng–48 with the United States Atomic Energy Commission.

Extremely fast pulses are variously utilized in such devices as computers, nuclear particle detectors and analyzers, and pulse coded communications systems, such pulses typically having a duration of the order of 50 to 100 nanoseconds ($10^{-9}$ second). In some communication systems information is conveyed by modulating the time delay of pulses, while in nuclear counting apparatus and computers, delay circuits are used, for instance, to compensate for unwanted inherent time delays. As a specific example, the present invention was developed for testing portions of a nuclear particle counter to obtain a train of output pulses which was increasingly delayed over a time period with respect to an input pulse train. Such a circuit is used for obtaining a continuous plot of the time-resolution curves for coincidence circuits, and for obtaining the amplitude-time relationships of time-to-height converters, thereby detecting irregularities in the curves which are easily overlooked using conventional point-to-point curve plotting techniques.

The present invention is an electronic circuit for accomplishing a controllable time delay of pulses in apparatus as described above or in other apparatus where a similar effect is needed. Each input pulse applied to the invention causes an output pulse to be created at a later time, the duration of the time delay being dependent upon the magnitude of the current in a modulating signal. Thus, the time delays imparted to output pulses may be modulated with respect to the input pulses in many various ways according to the waveshape of the modulating signal. In accordance with the invention, input pulses cause a normally nonconducting transistor to conduct and to create a current ramp through an inductance connected in series with a tunnel diode. The current increases linearly until the diode current exceeds the maximum possible in the low voltage state and the tunnel diode suddenly acquires negative resistance, triggering a delayed output pulse. Pulse delay is provided according to the time period it takes for the tunnel diode current to exceed the maximum current possible in the low voltage state, such time period being controlled by providing a modulating current through the tunnel diode which determines the reference current level upon which the current ramp is superimposed. In order for the invention to receive input pulses at a high repetition rate, it is necessary that after a delayed pulse is produced, the current level through the tunnel diode be returned very rapidly to the original quiescent reference level so that a subsequent pulse may be received.

Therefore it is an object of the present invention to provide a means for accurately delaying electrical pulses for intervals determined by an input signal.

It is another object of the present invention to delay pulses having a high repetition rate, the pulses being individually delayed for varying times.

It is another object of the present invention to provide a circuit for modulating the relative time delays of pulses in a train of pulses.

It is another object of the present invention to provide a circuit for very rapidly shifting a tunnel diode from the high voltage state to the low voltage state.

It is yet another object of the present invention to provide a pulse delay circuit with a linear relationship between the change in amplitude of an applied modulating signal and the change in the consequent time delay of pulses.

The invention, together with further objects and advantages thereof, will be better understood by reference to the following specification in conjunction with the accompanying drawing of which:

Figure 1:
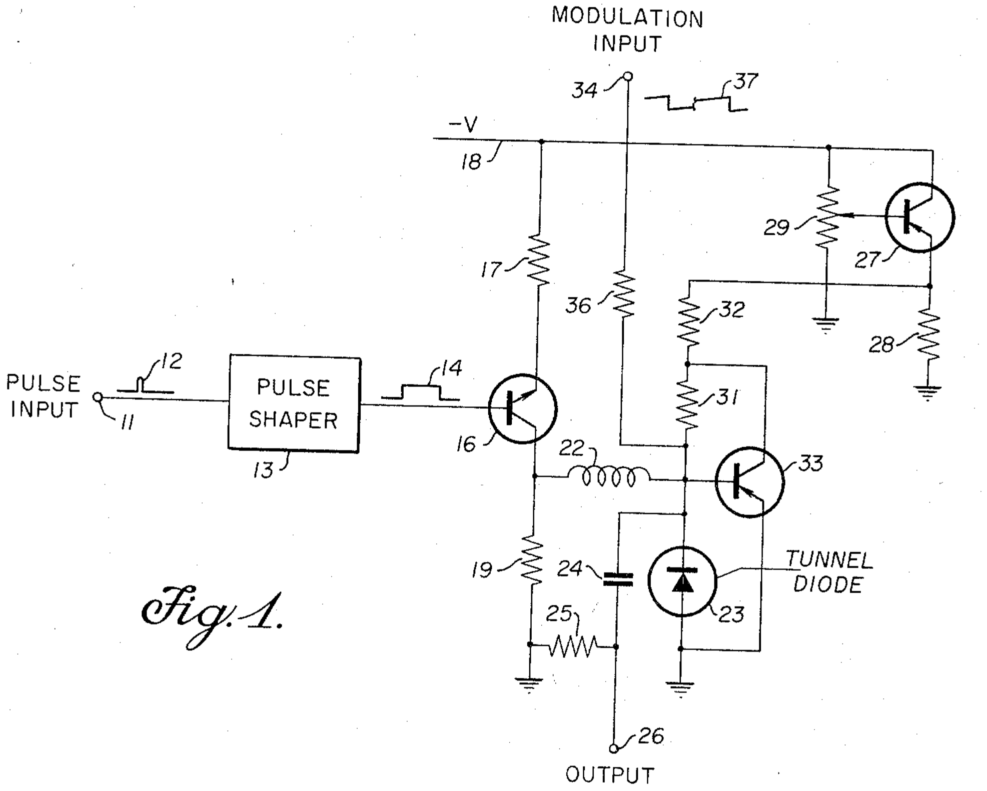
FIGURE 1 is a circuit diagram of a preferred embodiment of the invention.

Referring now to FIGURE 1, there is shown a pulse input terminal 11 for receiving pulses which are to be delayed. Pulses 12 applied to the input terminal 11 are standardized by a pulse shaper 13 using conventional circuitry which provides output pulses 14 each having uniform height and duration. The duration of the standardized pulses 14 must be at least as long as the longest time delay to be obtained from the invention. A PNP first transistor 16 is suitably biased to provide off-on switching, the transistor being nonconductive under quiescent condition and being fully conductive when a standardized pulse 14 is applied to the base of the transistor. The emitter of the transistor 16 is connected through a resistor 17 to a negative power supply terminal 18 while the collector is connected through a collector resistor 19 to ground.

An inductance 22 is connected to the collector of the first transistor 16, the inductive reactance causing current to flow in a linearly increasing quantity from such collector through the cathode of a tunnel diode 23 to a grounded anode. Thus, when the transistor 16 is made to be conductive by a pulse 14, a current "ramp" starting from zero and linearly increasing in magnitude is caused to flow through the tunnel diode 23.

Figure 2:
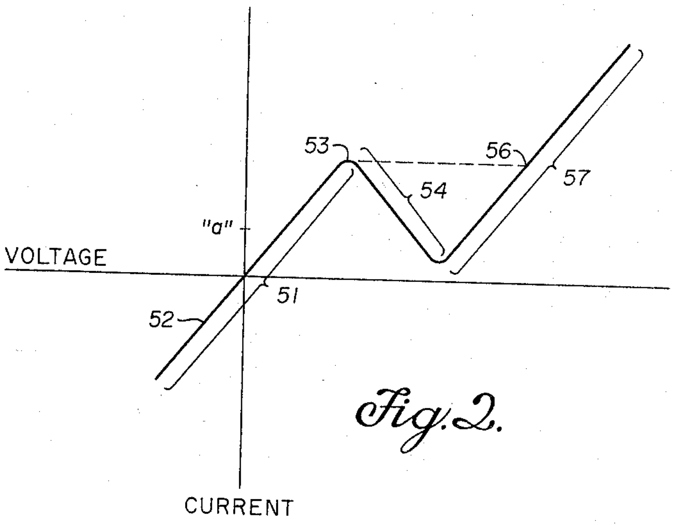
FIGURE 2 is a curve showing the conventional volt-ampere characteristic of a tunnel diode of the circuit of FIGURE 1 with voltage along the abscisa and current along the ordinate.

Referring to FIGURE 2 in conjunction with FIGURE 1, the tunnel diode 23 is normally in the low current portion 51 of the volt-ampere curve 52. When a current ramp is created by pulse 14, the resultant additional current flow through the tunnel diode 23 eventually causes the diode current to reach the maximum level 53 possible in the low voltage state, where the diode suddenly crosses the negative resistance portion 54 of the curve, raising the voltage level across the tunnel diode 23 to a value corresponding to point 56 on the high current portion 57 of the characteristic curve 52. The signal generated by such sudden rise in the voltage across the diode 23 is differentiated by a small capacitor 24 and resistor 25 and the resultant differentiated voltage pulse is available at an output terminal 26. Thus an output pulse is produced which is delayed with respect to the input pulse which caused the first transistor 16 to be conductive.

It is necessary that some means be provided for setting the level of the quiescent reference current through the tunnel diode 23 so that the duration of the time delay can be controlled. For such purpose, as shown in FIGURE 1, an emitter follower stage is provided in which an PNP third transistor 27 has a collector connected directly to the negative power supply bus 18 and has an emitter connected through an emitter resistor 28 to ground. The voltage level at the base of the third transistor 27 is set by a potentiometer 29 connected between the negative power supply bus 18 and ground, the adjustable slider then being connected to the base. A path for the quiescent current is created through a pair of voltage divider resistors 31 and 32 connected in series between the cathode of the diode 23 and the emitter of the third transistor 27. The magnitude of the quiescent reference current is thus adjustable by varying the setting of the potentiometer 29.

When the tunnel diode 23 is in the high current portion 57 of the volt-ampere characteristic curve after having produced an output signal, it is desirable to return to the quiescent current state as soon as possible so that the circuit will be in condition for receiving a subsequent input pulse. For such purpose, there is provided an PNP second transistor 33 having a grounded emitter, a base connected to the cathode of the diode 23, and a collector connected to the juncture of voltage divider resistors 31 and 32. Normally, the base and the emitter of the second transistor 33 are approximately the same potential, owing to the low potential differential across the diode 23, and the transistor accordingly does not conduct current. However, when the diode 23 is in the high voltage portion 57 of the volt-ampere curve, the potential difference across the diode 23 is increased and the transistor 33 becomes conductive, thereby forming a low impedance path to ground in parallel with the diode 23 and resistor 31. The reduced current flow through the diode 23 causes it to revert immediately to the low voltage condition, biasing the second transistor 33 back to the original quiescent state.

As described previously, there are two sources for current through the diode 23, one from the first transistor 16 resulting from input pulses 12, and a second source is the emitter follower 27 for setting a quiescent current reference level. To permit rapid modulation of the time delays of pulses in a pulse train, provision is made for applying a third current signal 37 at a modulation signal input terminal 34 coupled to the cathode of the diode 23 through a modulation resistor 36. Typically, such modulation signal 37 is provided from a conventional signal generator and the signal might have, for instance, a sawtooth waveform extending over a time base which is much longer than the time base of the input pulses 12.

Considering now the operation of the invention, assume that the portion of the current through the diode 23 coming from the third transistor 27 is a quantity *a* as indicated in FIGURE 2, thus establishing a base or reference level. Current from the modulation input terminal 34 is assumed to be zero. With the receipt of an input pulse 12, a ramp of current is created through inductor 22, starting at a fixed low level and linearly increasing. Since a quantity of current *a* is already passing through the diode 23, the ramp current adds to the current *a* until the peak 53 of the current-voltage curve is reached, causing a sudden higher voltage to be created across the diode 23 and causing a pulse to be provided at the output terminal 26. The time necessary for the ramp current to increase from value *a* to the peak 53 constitutes the pulse delay time. Since the ramp current always increases at the same rate, the delay time is changed by varying the magnitude *a* of the diode 23 current. In operation, the current *a* is generally set at the desired reference level and left unchanged thereafter. Rapid modulation of the time delay is provided by signals applied to the modulation input 34.

A signal applied to modulation input 34 adds or subtracts from the value of current *a* and thus the time necessary for the ramp current to reach the peak 53 is altered linearly with respect to the magnitude of the modulation signal. While the reference point *a* is indicated as a positive current, to obtain longer delay times the circuit may be arranged so that the reference current, and thus point *a*, is negative. The function of setting the reference level current and providing modulation may be combined into a single circuit.

In one example of the present invention, input pulses up to a maximum repetition rate of three million pulses can be accommodated. Pulse 14 is 70 nanoseconds long while the output pulse has a rise time of 2.5 nanoseconds and a fall time of ten nanoseconds. The minimum delay is approximately thirty nanoseconds and the maximum delay is sixty-five nanoseconds. For a one volt change in the modulating signal, the time delay is changed 165 picoseconds ($165 \cdot 10^{-12}$ sec.). The power supply polarity may be reversed, opposite types of transistors may be used, and the tunnel diode connections reversed to obtain a circuit essentially the same as that described.

Thus while the invention has been disclosed with regard to a particular embodiment, it will be apparent to those skilled in the art that numerous variations and modifications may be made within the spirit and scope of the invention and it is thus not intended to limit the invention except as defined in the following claims.

What is claimed is:

1. In an electronic circuit for providing a controllable time delay between input and output pulses, the combination comprising an input circuit for standardizing the shape and duration of input pulses, a current ramp generator of the class providing a linearly increasing quantity of current after receipt of a standardized input pulse, said ramp generator being coupled to said input circuit, an element of the class having a current-voltage characteristic divided into a low voltage range and a high voltage range separated by a negative resistance range, said element being connected to the output of said ramp generator, a current source also connected to said element to provide a reference current level therethrough, and a normally open voltage-controlled switch means connected in parallel with said element, said switch being of the class closing in response to a high voltage thereacross.

2. In a circuit for providing a delayed output pulse a controlled interval after receipt of an input pulse in which the delay interval is proportional to the amplitude of a modulating signal, the combination comprising an input circuit for receiving and standardizing input pulses, a current ramp generator of the class triggered on by an input pulse and receiving said standardized input pulses from said input circuit, a tunnel diode connected to the output of said current ramp generator and having a low voltage state and a high voltage state, a reference current source connected to said tunnel diode to provide a steady-state current therethrough, means for applying said modulating signal to said tunnel diode to provide a variable current therethrough, the sum of said reference current and said modulation current being within the range necessary to maintain said tunnel diode in said low voltage state, and a differentiator circuit connected across said tunnel diode to provide said delayed pulse output signal.

3. In a circuit for delaying fast pulses, the combination comprising a pulse shaper for standardizing the configuration of input pulses, a normally non-conductive first transistor having an input connected to the output of said pulse shaper and being of the class which becomes conductive upon the receipt of a pulse, an inductor, a tunnel diode connected in series with said inductor and said first transistor and having a high voltage state and a low voltage state, a reference current source connected in series with said diode, a modulation current source connected in series with said diode, and a differentiation output capacitor connected to the juncture of said inductor and said diode.

4. In a circuit for delaying pulses as described in claim 3 wherein a path for current is provided in parallel with said diode, the further combination comprising a normally open switching element in said path and adapted to close in response to the condition wherein said diode is in said high voltage state.

5. In a circuit for delaying fast pulses, the combination comprising a pulse shaper for standardizing the configuration of said fast pulses, a current ramp generator having actuating means connected to the output of said pulse shaper, a tunnel diode connected to the output of said ramp generator and having a low voltage and a high voltage state, a differentiator responsive to voltages developed across said diode, a current source connected in series with said tunnel diode, an impedance connected in series between said diode and said current source, and a transistor having an emitter and a base connected across said diode and having the base and a collector connected across said impedance whereby a low impedance current path is provided from the emitter to the collector of said transistor when said diode is in a high voltage state.

6. In an electronic circuit for accurately delaying pulses, the combination comprising a first normally nonconducting transistor having a base receiving said pulses and in which said input pulses render said first transistor conductive, an inductor, a tunnel diode having a low voltage state and a high voltage state connected to the collector of said transistor in series with said inductor, a current source connected to the juncture of said inductor and said diode, a differentiator output circuit connected to the juncture of said inductor and said diode, means modulating the current through said diode, said modulating means having a modulating signal level which provides that the sum of the currents through said diode in the absence of an input pulse is sufficiently low to maintain said diode in said low voltage state.

7. In a delay circuit for fast positive input pulses, the combination comprising a power source having a negative voltage terminal and positive voltage terminal, a normally nonconducting first NPN transistor having a base connected to a source of input pulses and having an emitter and a collector coupled to said negative and said positive terminal respectively, an inductor connected to the collector of said first transistor, a tunnel diode having a cathode connected in series with said inductor and having an anode connected to said positive terminal, an impedance, a reference current control having one side connected in series with said impedance to the cathode of said diode and having the opposite side connected to said negative terminal, a PNP second transistor having a base connected to the cathode of said tunnel diode and having an emitter connected to the anode of said tunnel diode and having a collector connected to the juncture of said impedance and said reference current control, a differentiator output circuit connected to the cathode of said tunnel diode, and a modulation current input terminal connected to the cathode of said tunnel diode.

8. In a delay circuit for fast negative input pulses, the combination comprising a power source having a positive voltage terminal and a negative voltage terminal, a first PNP transistor having a base connected to a source of input pulses and having an emitter connected to said positive terminal and having a collector connected to said negative terminal, an inductor connected to the collector of said first transistor, a tunnel diode having an anode connected in series with said inductor and having a cathode connected to said negative voltage terminal, an impedance, a reference current control having one side connected in series with said impedance to the anode of said diode and having the opposite side connected to said positive terminal, an NPN second transistor having a base connected to the anode of said diode and having an emitter connected to the cathode of said diode and having a collector connected to the juncture of said impedance and said reference current control, a differentiator output circuit connected to the anode of said tunnel diode, and a modulation current input terminal connected to the anode of said diode.

References Cited by the Examiner

UNITED STATES PATENTS

| | | | |
|---|---|---|---|
| 2,826,693 | 3/1958 | Resnik | 331—129 |
| 3,096,445 | 7/1963 | Herzog | 307—88.5 |
| 3,104,331 | 9/1963 | Zinke | 307—88.5 |
| 3,135,877 | 6/1964 | Fischman | 307—88.5 |
| 3,170,124 | 2/1965 | Candilis | 307—88.5 |
| 3,188,489 | 6/1965 | Dorsey | 307—88.5 |

ARTHUR GAUSS, *Primary Examiner.*

J. S. HEYMAN, *Assistant Examiner.*